Aug. 10, 1948.                M. ROSS                    2,446,956
                         MEAT TESTING FORK
                        Filed March 19, 1946
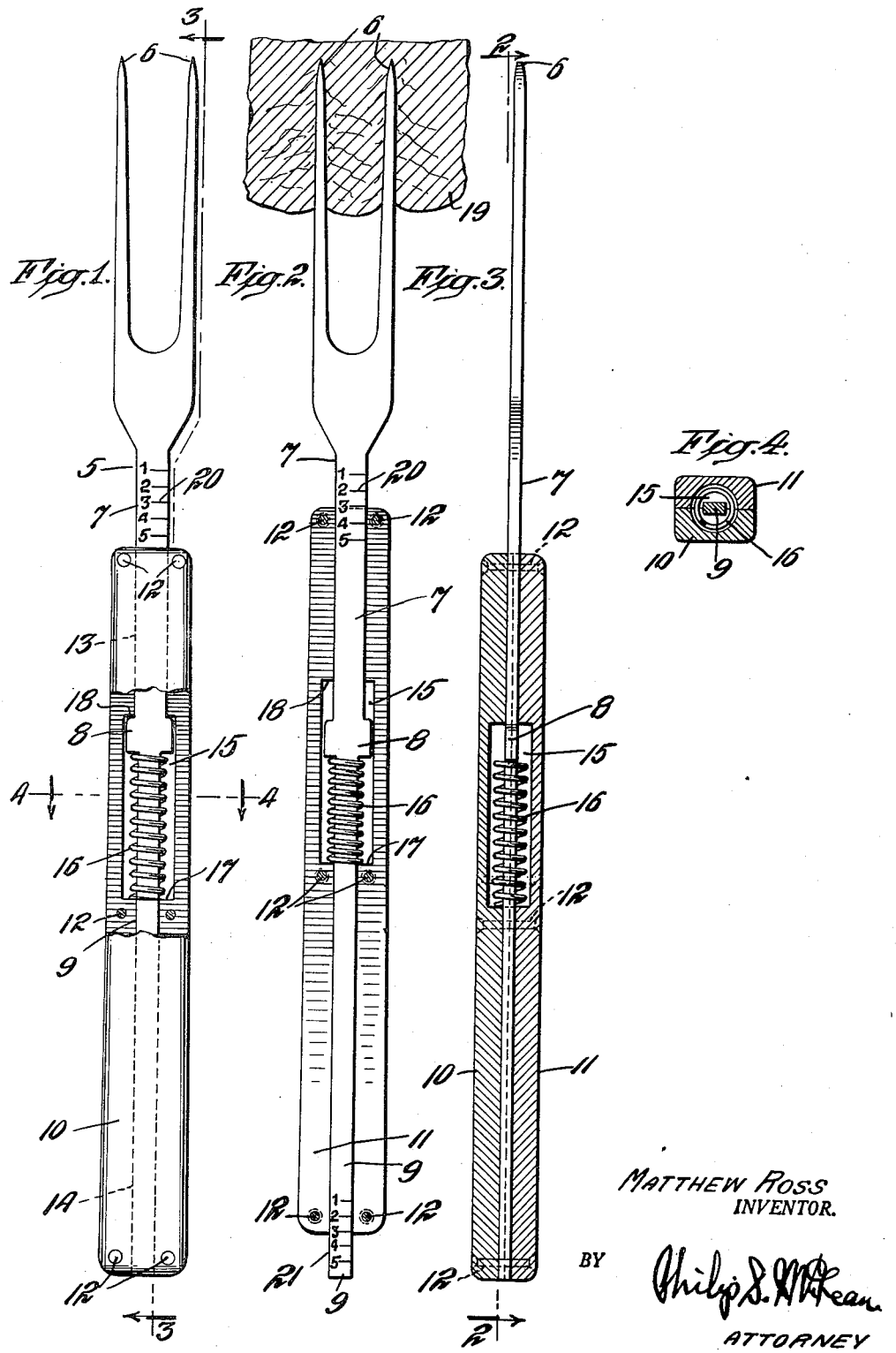
MATTHEW ROSS
    INVENTOR.
BY
    Philip S. McKean
         ATTORNEY Patented Aug. 10, 1948

2,446,956

UNITED STATES PATENT OFFICE 2,446,956

MEAT TESTING FORK

Matthew Ross, Rego Park, N. Y., assignor to Hi-Seat Corporation, New York, N. Y., a corporation of New York Application March 19, 1946, Serial No. 655,425

1 Claim. (Cl. 73—81)

The invention here disclosed relates to culinary implements in the nature of forks and special objects of the invention are to provide an implement of this character which will be useful for testing the relative tenderness, coarseness, the extent or depth to which a piece of meat or other edible has been cooked and other such factors pertaining to the preparation of meats and food products generally.

Further special objects of this invention are to provide a meat testing fork which will be of simple, durable, inexpensive construction and generally useful and practical for the purposes intended.

Other desirable objects and the novel features by which the purposes of the invention are attained are set forth or will appear in the course of the following specification.

Figure 1 in the drawing is a plan and part sectional view of the fork.

Figure 2 is a longitudinal sectional view as on substantially the plane of line 2—2 of Figure 3.

Figure 3 is a longitudinal sectional view on substantially the plane of line 3—3 of Figure 1.

Figure 4 is a transverse sectional view as on substantially the plane of line 4—4 of Figure 1.

The construction illustrated is of particularly simple form, comprising a long flat bar 5 having tines 6 at one end, a parallel sided front shank portion 7, an intermediate widened shoulder portion 8 and a reduced parallel sided rear shank portion 9, this bar mounted in longitudinally slidable fashion in a combined handle and spring housing.

The handle structure is shown made up of complemental front and back handle pieces 10, 11, secured together in flat face to face relation by rivets 12, screws or other suitable through fastenings, said handle parts being channeled at 13, 14 in the meeting faces to slidingly receive the shank portions 7 and 9 and chambered at 15 in the mid-length portions to accommodate the widened mid-portion 8 and the spring 16.

The latter is shown surrounding the narrower shank portion 9 in back of the enlarged shoulder portion 8 and bearing against the shoulder 17 at the back of the chamber 15 so as to thrust the bar forwardly with the tines extended as in Figure 1. In this relation the forward face of the enlargement 8 engages the shoulder 18 at the front end of the chamber 15.

Figure 2 shows how in use the tines will penetrate a body of meat or other material 19 to an extent dependent upon the density, toughness and other characteristics and in so doing will be repressed into the handle against the opposition of the spring 16.

The extent of repression may be indicated by suitable scales or graduations such as shown at 20, 21 on the front, exposed shank portion 7 and on the normally housed or concealed rear shank portion 9.

These marks may be such as to represent different degrees of relative tenderness, hardness, softness or the like.

One advantage of having the markings both on the front and the rear ends of the fork shanks is that in use one end of the fork may be much more accessible for viewing than the other. Also one scale may be different than the other so that two kinds of indications may be available.

The sliding tine bar may be made from a single piece of fairly rigid flat strip or sheet metal. The two part handle may be made of wood, bone, plastic or other materials, in duplicate pieces secured together over the enclosed spring and sliding bar. The flat formation of the sliding bar prevents it from twisting or binding in the handle so that the device will be accurate and continue so even with extended or rough usage.

What is claimed is:

A fork for testing the tenderness of meat and the like, comprising a fork bar of flat material having meat penetrating fork tines at one end, a flat, narrow shank portion in back of said fork tines, a flat, narrow shank portion at the opposite end and a wider, intermediate portion between said narrow shank portions, a handle in two opposed parts having narrow, flat channels in the mating faces at opposite ends of the same slidingly receiving said narrow, flat shank portions of the bar and an elongated intermediate enlarged chamber portion freely receiving the wider intermediate portion of the flat bar, a spring surrounding said narrow shank portion at said opposite end of the bar and engaged between the inner end of said wider portion of the bar and the back wall of said chamber in the handle for thrusting said bar outward of the handle to the extent permitted by engagement of the outer end of the wider bar portion with the front wall of said chamber and cooperative markings on the bar and handle serving, in relatively repressed positions of the fork bar in the handle, to indicate grades of meat tenderness and the like.

MATTHEW ROSS.

REFERENCES CITED

The following references are of record in the file of this patent:

UNITED STATES PATENTS

| Number | Name | Date |
|---|---|---|
| 1,637,421 | Lipschutz | Aug. 2, 1927 |
| 1,802,685 | Trier | Apr. 28, 1931 |
| 1,942,982 | Schneider | Jan. 9, 1934 |
| 2,372,662 | Dewey | Apr. 3, 1945 |

FOREIGN PATENTS

| Number | Country | Date |
|---|---|---|
| 267,297 | Italy | Aug. 31, 1929 |
| 278,179 | Italy | Oct. 2, 1930 |
| 317,824 | France | Jan. 16, 1902 |
| 582,637 | France | Oct. 17, 1924 |